W. F. MEYERS & M. SIMONS.
SHAPING MECHANISM FOR PLANING MACHINES.
APPLICATION FILED AUG. 24, 1915.
1,216,588.
Patented Feb. 20, 1917.
5 SHEETS—SHEET 3.
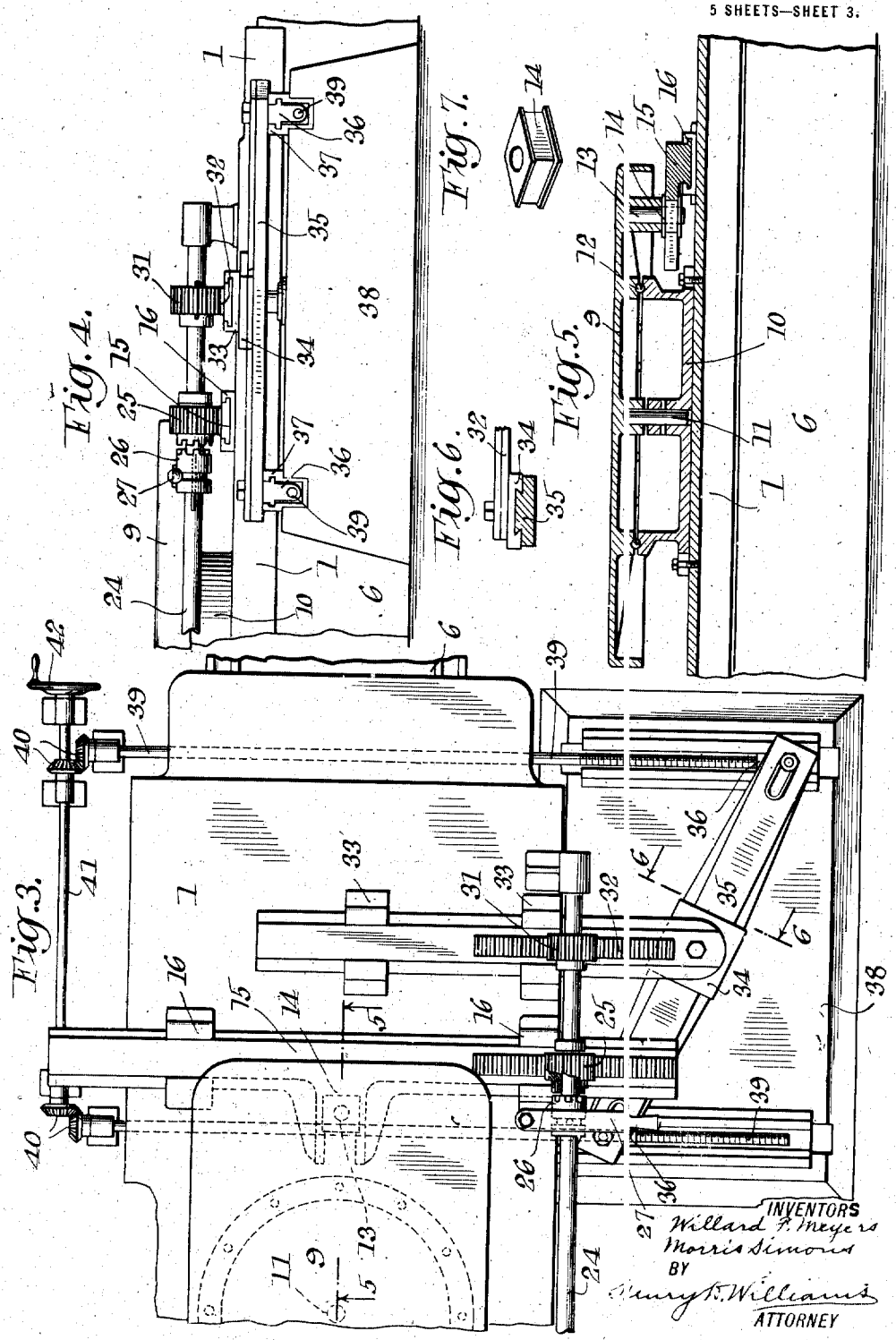
INVENTORS
Willard F. Meyers
Morris Simons
BY
Henry F. Williams
ATTORNEY

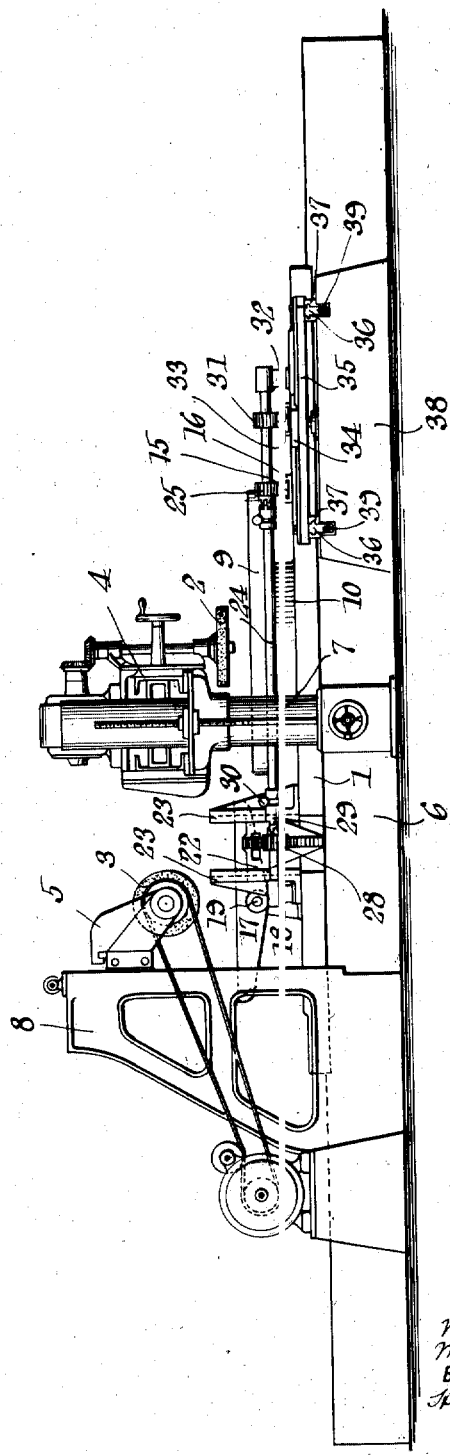

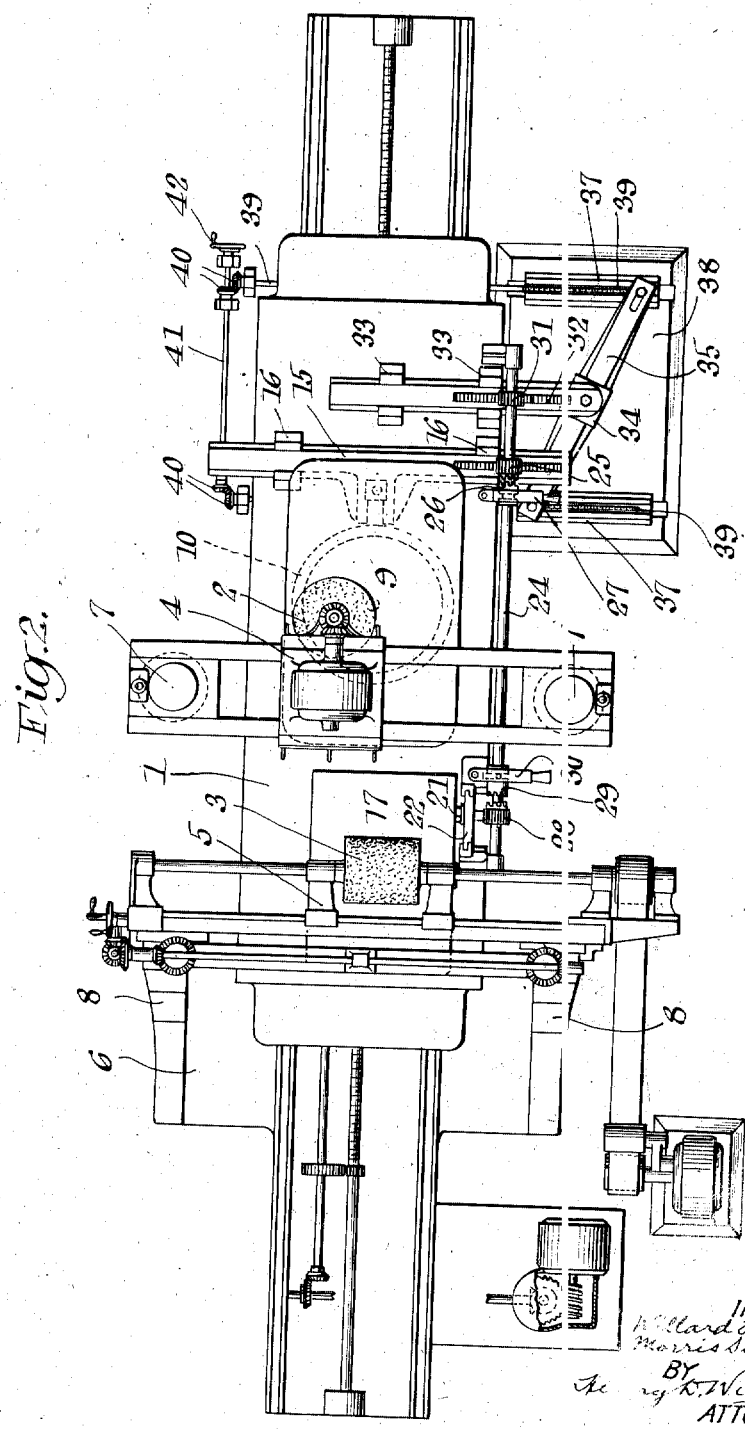

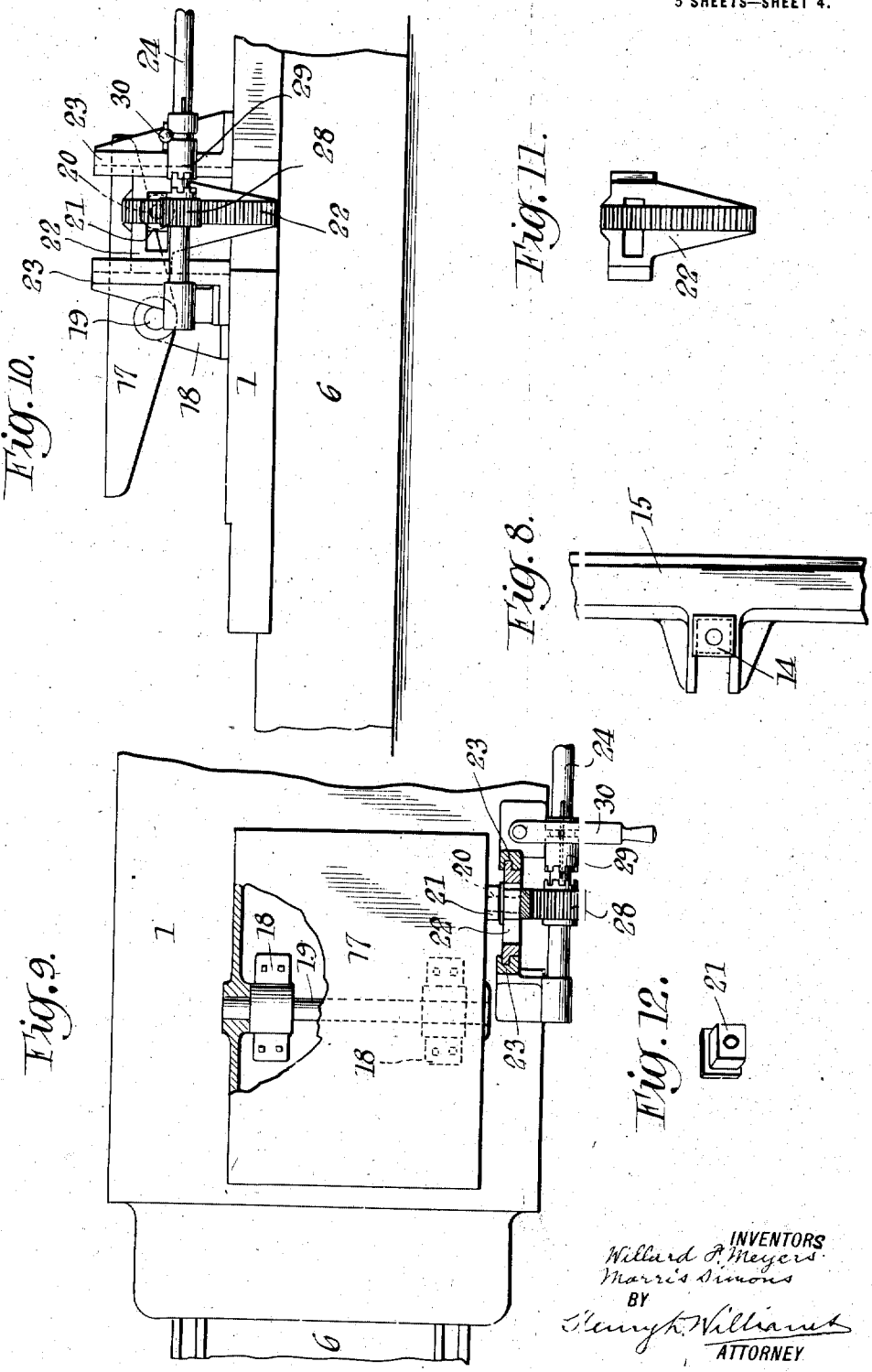

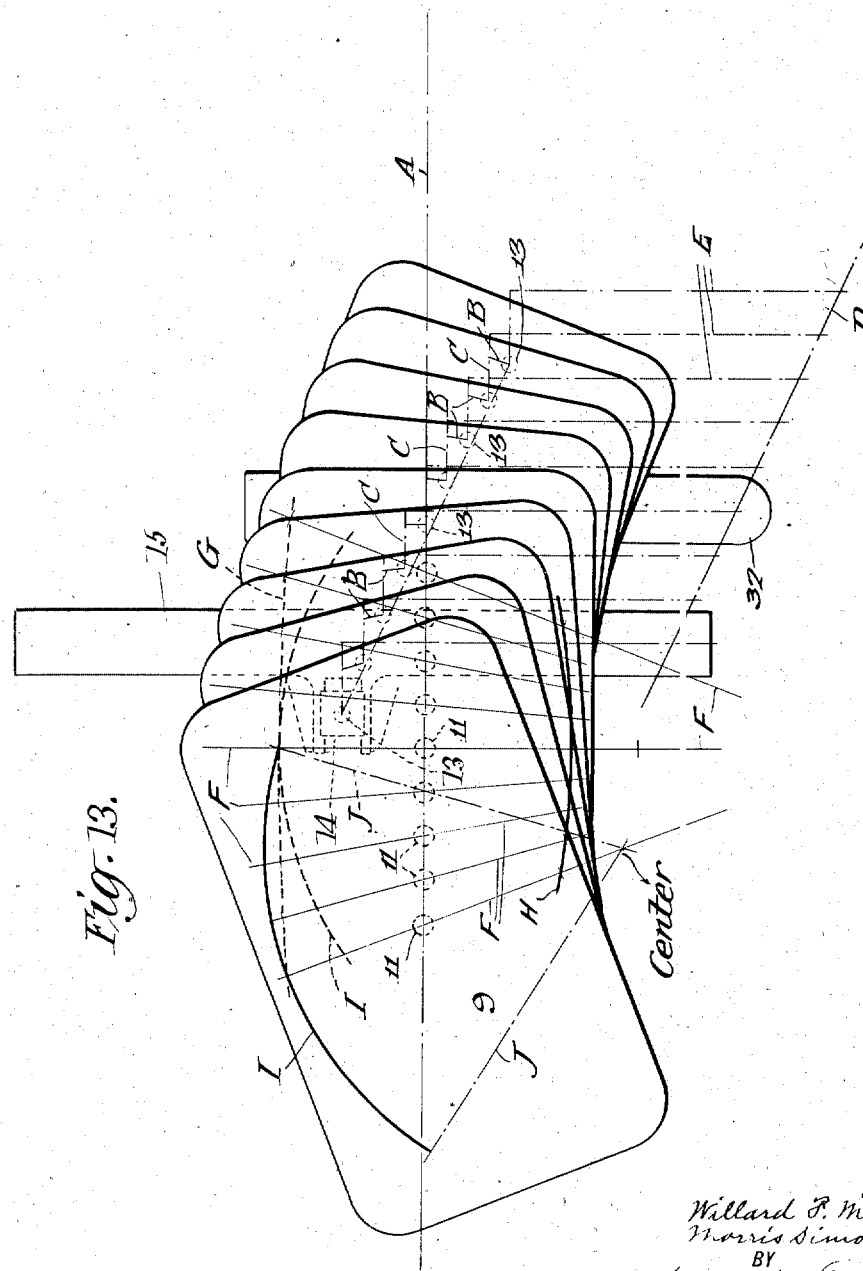

UNITED STATES PATENT OFFICE.

WILLARD F. MEYERS, OF LONG ISLAND CITY, AND MORRIS SIMONS, OF NEW YORK, N. Y.

SHAPING MECHANISM FOR PLANING-MACHINES.

1,216,588. Specification of Letters Patent. Patented Feb. 20, 1917.

Application filed August 24, 1915. Serial No. 47,031.

*To all whom it may concern:*

Be it known that we, WILLARD F. MEYERS, a citizen of the United States, residing at Long Island City, borough of Queens, county of Queens, and State of New York, and MORRIS SIMONS, a subject of the Czar of Russia, residing at the borough of Bronx, in the county of Bronx and State of New York, have invented certain new and useful Improvements in Shaping Mechanisms for Planing-Machines, of which the following is a specification, reference being had therein to the accompanying drawings, forming part thereof.

Our invention relates to planing machines for stone or metal, such as molding or surfacing machines for dressing or shaping the work along straight or curved lines or with flat or curved surfaces, and relates more particularly to a shaping mechanism or attachment for enabling a straight molding or surfacing machine to be used for dressing or cutting curved surfaces, particularly curves which form a part of the arc of a circle or arcuate curves of long radii, such curves being known in the art as radial curves. Machines which would correctly form these long arcuate or true radial curves have been heretofore produced, but such machines have been generally large, complicated and expensive, the stone and metal shaping machine forming the subject of Patent No. 987,390 of March 21, 1911, to Willard F. Meyers, one of the present joint inventors, being a good example of such a machine. Other simpler and less expensive machines and planer attachments for forming curved surfaces on the work have been generally faulty and defective in that they would not produce a true radial curve, that is to say, a curve which forms a true arc of a circle. This problem has given much trouble in the stone-working art in which the simpler machines, although known to be defective, have been mostly used because of their comparative inexpensiveness.

The main object of our present invention is to produce a simple and comparatively inexpensive mechanism which may be readily installed upon or attached to an ordinary or common straight line planer or surfacing machine and which will produce true radial or arcuate curves of longer or shorter radii as may be desired. Another object of our invention is to produce such a mechanism or machine adapted to operate either upon the upper surface of the work, or upon one of its lateral or vertical surfaces, as desired, and preferably capable of performing these similar but different operations upon two pieces of work concurrently or at the same time, if so desired. Other objects of our invention are convenience of use, maintenance in working condition, durability and further objects and advantages which will hereinafter appear.

Our invention includes means for imparting oscillating or rocking movements of such a nature or character to a work-supporting platen or table pivoted upon a planer bed that a true arcuate curve will be described on the work by the combining of the rocking or oscillating pivotal movement of the work support with the straight line movement relatively to each other of the planer bed and a tool carrier. Our invention also includes means for operating two such work supports, either one at a time each independent of the other, or both at once concurrently, as may be desired, one of these work supports being oscillatable upon a vertical axis and the other of which is rockable upon a horizontal axis. Our invention also more particularly includes improved operating connections by means of which a simple straight inclined movement-imparting bar may be employed to impart through such connections the required oscillating movement to the work carrier for producing true or correct radius curves. Our invention further includes features of construction and combinations of parts as will appear from the following description.

We shall now describe the planing machine embodying the shaping mechanism of our invention illustrated in the accompanying drawings and shall thereafter point out our invention in claims.

Figure 1, is a side elevation on a reduced scale of a planing machine equipped with the shaping mechanism of our invention.

Fig. 2 is a plan of the same.

Fig. 3 is an enlarged plan partly broken away of what appears at the right in Figs. 1 and 2.

Fig. 4 is an elevation as viewed from the front in Fig. 3.

Fig. 5 is a partial central vertical longitudinal section on a plane indicated by the line 5—5 of Fig. 3 as viewed from the front.

Fig. 6 is a partial diagonal section on a plane indicated by the line 6—6 of Fig. 3 as viewed from the right and slightly upward.

Fig. 7 is a perspective of a sliding bearing block employed as part of the operating connections.

Fig. 8 is a partial plan of the horizontally reciprocative table-oscillating slide as it appears in Fig. 3 together with the sliding bearing block of Fig. 7 coöperative therewith.

Fig. 9 is a partial plan partly broken away similar to Fig. 3 of what appears at the left in Figs. 1 and 2.

Fig. 10 is a front elevation of what appears in Fig. 9.

Fig. 11 is a detached elevation of the vertically reciprocative table-rocking slide as it appears in Fig. 10.

Fig. 12 is a perspective of a sliding bearing block included in the connections between the vertical slide of Fig. 11 and the rocking table.

Fig. 13 is a diagram indicating the operation of the oscillative work-supporting table pivoted on the planer bed on a vertical axis.

In the planing machine embodying our invention illustrated in the drawings, the shaping mechanism of our invention is shown as embodied in and combined with a usual planer or straight molding machine which may be used for straight or flat work either with or without the shaping mechanism of our invention, but our invention adapts it for radius or arcuate curvilinear work. In the embodiment of our invention illustrated in the drawings both rectilinear and curvilinear feed movements are imparted to the work supports and these two movements are so combined as to cause the desired true arcuate curves to be described on the work as it moves past a tool supported on a stationary tool carrier.

The general construction of the planing machine illustrated in the drawings need not be further described other than to note that it is of a usual type in which a planer bed 1 has a longitudinal traverse movement past a stationarily mounted tool, or there may be a plurality of such stationarily mounted tools. In the planer construction illustrated in the drawings as embodying our invention, two such tools are shown both being shown as rotary tools of abrasive material. One of these tools 2 is rotative on a vertical axis for shaping or surfacing the lateral or vertical surface of the work, and the other of these tools 3 is mounted on a horizontal axis transverse to the planer bed 1 for operating upon the upper surface of the work, either the one or the other of these tools being employed according to the shape and dimensions of the work and in the machine illustrated in the drawings, both of these tools 1 and 2 may be concurrently used upon different pieces of work. The tool 2 having a vertical axis is supported by a tool carrier or carriage 4 and the tool 3 having a transverse horizontal axis is supported by a tool carrier or carriage 5. The tool carriers 4 and 5 together with the tools 2 and 3 respectively carried thereby are of course adjustable both vertically and transversely from side to side of the machine, as is common and well understood, and as appears in the drawings. In the type of machine illustrated in the drawings the tools, such as 2 and 3, and their carriages 4 and 5 are bodily stationary during the operation of the machine and the movable bed 1 carries the work past the tools to be operated on thereby as hereinbefore mentioned. The main stationary frame part of the planer includes a main base 6 provided as appears in Fig. 2 with tracks or rails forming ways for the planer bed 1, main supporting posts 7 for the adjustable tool carriage 4 and an upright supporting frame 8 for the other adjustable tool carriage 5.

For coöperation with the stationarily mounted rotary tool 2 for forming or dressing the lateral vertical surfaces of the work, a horizontal work-supporting table or platen 9 is pivoted for rotative or oscillative movements on a base support 10 by means of a central vertical journal or stud 11 and ball bearings 12, and the supporting base 10 is bolted or otherwise firmly and securely anchored to the planer bed 1, as is shown in the drawings, particularly in Fig. 5. On its lower side outward from the supporting base 10 the work-supporting platen 9 is provided with a rigidly projecting crank pin or wrist pin 13. A flanged block 14 forms a bearing for the wrist pin 13, and in operation this bearing block 14 lies between and is moved by a pair of operating jaws shown as projecting from a platen-oscillating slide 15 and forming ways transversely of and at right angles to this slide. The slide 15 extends transversely of the planer bed 1 and is mounted thereon to slide at right angles to the path of movement of the bed 1 by means of a pair of guide clips 16 fixed on the upper side of the planer bed 1. It will be noted that the slide 15 virtually or in effect forms a slotted cross-head. The platen-oscillating slide 15 is shown as provided on its upper side adjacent to one of its ends with rack teeth, and means, presently to be described, are provided engageable with these rack teeth so as to impart sliding movements to the slide 15 at a uniform rate as compared with the traverse movements of the planer bed 1, these sliding movements being imparted to the slide 15 by reason of such straight line traverse movements of the planer bed 1 so that the reciprocative movements of the slide 15 will impart oscillative movements to the work-supporting platen 9 and these oscillative movements imparted to the work-supporting platen 9 will be of such a nature, as will presently appear, as to compel the tool 2 to describe a curve which will be a true arc of a circle upon the edge or lateral vertical surface of the work supported upon the platen 9.

For producing an arcuate or radial curved surface on the top or upper surface of the work, a tilting or rockable work-supporting table 17 is mounted for tilting or rocking movements on the planer bed 1 by means of upright supporting pedestals 18 secured to the top of the planer bed 1, and a trunnion shaft 19, the axis of which is parallel to the upper surface of the planer bed 1 and at right angles to the path of traverse movement of the bed, the rocking table 17 being located beneath the rotary tool 3 for coöperation therewith, as clearly appears in the drawings. At one of its sides the rocking work-supporting table 17 is provided with a rigidly projecting crank pin or wrist pin 20 which is pivoted in a bearing block 21. The bearing block 21 is mounted to slide horizontally in a slot formed in the upper part of a vertically reciprocative slide 22 which forms a slotted cross-head and in its upper part is guided between upright guides 23 which form vertical guideways for the slide 22 and which are firmly secured to and shown as projecting upwardly from the planer bed 1, which is shown as notched for the slide 22. Upon its outer surface the slide 22 is shown as provided with rack teeth and means engageable with these rack teeth for rocking the work-supporting table 17 by reason of and at a uniform rate as compared with the straight line traverse movement of the planer bed 1 are presently to be described.

Means in common for oscillating the work-supporting platen 9 upon the planer bed 1 and also for rocking the rocking work-supporting table 17 on the bed 1, these common means being operated by the longitudinal traverse movement of the planer bed 1, are provided and such operating means include means for oscillating the platen 9 and the table 17 either concurrently or independently and separately as may be desired.

For actuating the slide rack 15 of the oscillating table 9 and the vertical slide rack 22 for the rocking table 17 a common operating shaft 24 is mounted in bearings on and extends along one edge of the planer bed 1, as shown in the drawings. A pinion 25 which is loosely rotative upon the side shaft 24 meshes with the rack teeth of the platen-oscillating slide 15 and may be rotatively connected to the operating shaft 24 by means of a tooth clutch 26 splined on the shaft 24 and controlled by a hand lever 27. The table-rocking vertically sliding rack 22 is engaged by a similar pinion 28 loosely rotative on the shaft 24 and which may be rotatively connected therewith by means of a toothed clutch member 29 splined on the shaft 24 and controlled by a hand lever 30. It will be noted that either one or both of the clutch members 26 and 29 may be engaged or disengaged from its corresponding loose pinion, both of these clutch members being shown in the disengaged position in the drawings. It will be observed that the shaft 24 and its adjuncts constitutes part of the means in common for operating the oscillative platen 9 and the rocking table 17.

The means or device for actuating the longitudinal side shaft 24 will now be described. An operating pinion 31 fixed upon the longitudinal side shaft 24 is engaged by rack teeth formed upon the upper side of a slidable rack bar 32 which is slidable in guide clips 33 transversely of the planer bed 1 and in a path at right angles to the path of movement on the planer bed. The rack bar 32 projects at the side beyond the planer bed 1 and at its outer end is pivoted to a sliding pivot block 34 which is guided by and slidable along a stationary straight movement-imparting bar 35. Although the movement-imparting bar 35 is held stationary during the operation of the machine, yet this bar is mounted for adjustment to different angular positions relative to the length and the path or direction of the sliding movement of the planer bed 1 and may be adjusted to an angular inclination in either direction or it may be adjusted to a median position in which it is parallel with the length of the planer bed 1 and with the direction of sliding traverse movement of the planer bed.

In carrying out our invention the movement-imparting operating bar 35 is supported only at its opposite ends and means are provided for simultaneously oppositely adjusting the opposite ends of that bar, thereby to alter its angular position without affecting its bodily position. The ends of the operating bar 35 are longitudinally slotted, as appears in the drawings, and at each of these slots is pivotally connected to a traveling nut 36 which is guided by a guide rail 37 parallel with the path of sliding movement of the rack bar 32, these guide rails 37 being fixedly mounted upon a small supporting base 38 at the side of the main base 6 of the planing machine. The traveling nuts 36 are engaged by two like and similarly screw-threaded adjusting screws 39 which are journaled in stationary bearings as shown and which are geared together to be rotated in opposite directions by means of two pairs of similar bevel pinions 40, one of these pinions of each pair being fixed upon the adjacent ends of the adjusting screws 39 and the remaining two of these pinions being fixed upon a screw-connecting and screw-operating shaft 41, shown as provided at one end with a hand wheel 42. It will now be understood that rotation of the hand wheel 42 will result in movements of the opposite ends of the operating bar 35 in opposite direction and the corresponding changing of its angular position.

In the operation of the shaping mechanism of our invention, as the planer bed 1 travels longitudinally back and forth on the guide rails of the main base 6 in the usual and well known way, the planer bed 1 carries with it the horizontal oscillative work-supporting table 9, the rocking work-supporting table 17, the transversely reciprocative table-oscillating slide 15, the vertically reciprocating table-rocking slide 22, the common operating shaft 24, and its immediate adjuncts and accessories, the common sliding rack bar 22 and its pivot block 34, all of which partake of the usual to and fro traverse movements of the planer bed 1. The sliding of the pivot block 34 on the inclined movement-imparting operating bar 35 in one direction then in the other imparts oscillative rotation to the operating shaft 24 for oscillating the platen 9 and rocking the table 17 under the control of the hand operated clutches as hereinbefore described. Inclination of the operating bar 35 in one direction will produce a convexly curved surface on the work and the inclination of this bar in the other direction will produce a concavely curved surface on the work, and with the operating bar 35 adjusted parallel to the path of movement of the planer bed 1, no oscillating or rocking movement will be imparted to the work-supporting platen 9 and table 17, and these work supports will be held stationary relatively to the planer bed 1. The extent of the curvature produced will be determined by the amount of inclination of the operating bar 35 and may be anything from a straight line up to the capacity of the machine. The movements of the work-supporting platen 9 relatively to the stationarily mounted tool are indicated diagrammatically in Fig. 13 of the drawings.

The operating connections between the inclined movement-imparting operating bar 35 and the oscillative work-supporting tables 9 and 17 are such that true radial curves will be produced on the work fixed upon either of the tables. An inclined operating bar generally similar to the bar 35 has been heretofore employed in planer attachments for imparting oscillating movements to work-supporting tables, but the operating connections between such a bar and the table have not been such as would produce correct and true radial curves upon the work, but on the other hand much trouble has been given by the defective operation of these devices. Our invention enables the employment of this simple operating device, the inclined bar 35, for the production of true arcuate curves of long radii which heretofore, as hereinbefore mentioned, has only been accomplished by means of more complicated, costly and cumbersome machines. In our invention the connection of the table-oscillating slide such as 15 with the table to be oscillated such as 9 is of particular importance. It has been found essential to have a pivotal connection to the oscillative work-supporting table, such for example as the rigidly projecting wrist pin 13 of the oscillating platen 9, and to have a straight or rectilinear sliding connection transversely of and at right angles to the table-operating slide, such as the slide 15 which provides guideways between its projecting jaws for the sliding pivot block 14 of the wrist pin 13. This slotted cross-head feature of construction has been found to accelerate the pivotal or angular movements of the work-supporting table, such as 9, to just the required extent necessary to compensate for its altered angular position as compared with its direction of straight line travel past the stationarily mounted tool.

In Fig. 13 of the drawings the bodily traverse movement of the platen 9 is indicated by the longitudinal straight broken line A, successive equally spaced positions of the pivot stud 11 being shown along this line. The corresponding angular movement of the platen 9 is indicated by the successive short arcs B, drawn from successive positions of the wrist pin 13 to short horizontal lines C which are parallel to the line of travel A at the successive positions of the wrist pin 13. It should be noted that these arcs B are shortest at the middle of the series and grow successively longer toward each end, correctly representing the accelerated or gradually faster and faster angular movement of the platen 9 as it approaches the ends of its path of bodily traverse movement along the line A. The inclined broken line D represents the path of movement of the sliding pivot block 34 along the operating bar 35, and the vertical broken lines E rising therefrom indicate successive positions of the slotted cross-head or slide 15 corresponding to the successive positions of the pivot stud 11 of the platen 9. The lines F indicate successive angular positions of the platen 9, the travel of a point on the platen 9 being indicated by the dotted curved line G, and the travel of another point on the platen is indicated by the heavy curved line H.

The combining of the rectilinear bodily movement of the platen 9 as indicated by the successive positions of the pivot stud 11 on the line of movement A, with the rotative or angular movement as indicated by the series of arcs B and lines F, will in one position of the stationarily mounted tool 2 cause a resultant arc or radial curve I to be described on the work carried by the platen 9, this radial curve I being shown as a full line at one of the extreme positions of the platen 9 and being shown as a dotted line at the middle position of the platen 9 appearing in Figs. 2 and 3. The radii of the arc I, two of which are shown by broken lines J extending from the ends of the radial curve I appearing at the extreme position of the platen 9, meet at a center far removed from the central pivot 11 of the platen 9, as appears in Fig. 13. It will now be clear how a true arc or radial curve, such for example as the curve I, is described on the work carried by the platen 9, or table 17, past the stationarily mounted tool 2 or 3. It will be understood that Fig. 13 only represents movements of the work-supporting platen 9 corresponding to a single adjustment of the operating bar 35, and that other movements producing other curves on the work will be produced by different positions of angular adjustment of the operating bar 35.

In some machines, although the construction is not general, the tool is supported by a frame which has a to and fro traverse movement corresponding to that of the planer bed 1, in such machines the planer bed being stationary. It is to be understood that our present invention could be similarly applied to such machines the general combination not being affected. In such a case the inclined operating bar corresponding to the bar 35 would be carried by the tool supporting frame, the relative movements of the several parts being the same. In the case of some smaller machines having only a single tool, such for example as the tool 2, parts of the double or common operating connections illustrated in the drawings would be omitted. For example in such a machine the table-oscillating rack bar or slide 15 for the work-supporting platen 9 could be directed pivotally connected to the pivot block 34 on the movement-imparting operating bar 35.

It is obvious that various modifications may be made in the construction shown in the drawing and above particularly described within the principle and scope of our invention.

We claim:

1. A shaping mechanism having, in combination, an oscillatable work support, a reciprocative slide for oscillating the work support slidable transverse to the axis of oscillation of the work support and having thereon a straight slideway transverse to the path of its sliding movement, a connecting member forming a pivotal connection to the work support and slidable along the transverse slideway on the slide, an operating member forming a straight inclined guideway for reciprocating the slide, and means for mounting the work support and operating member for relative bodily straight line movement at an angle to the guideway formed by the operating member and transverse to the axis of oscillation of the work support.

2. A shaping mechanism having, in combination, an oscillatable work support having a wrist pin, a reciprocative slide for oscillating the work support slidable transverse to the axis of oscillation of the work support and having a transverse slideway engaging with the wrist pin to oscillate the work support, an operating member forming a straight inclined guideway for reciprocating the slide, and means for mounting the work support and operating member for relative bodily straight line movement at an angle to the guideway formed by the operating member and transverse to the axis of oscillation of the work support.

3. A shaping mechanism having, in combination, an oscillatable work support having a wrist pin rigidly projecting therefrom, a reciprocative slide for oscillating the work support slidable transverse to the axis of oscillation of the work support and having thereon a straight slideway transverse to the path of its sliding movement, a sliding block guided by the slideway and forming a pivotal bearing for the wrist pin, an operating member forming a straight inclined guideway for reciprocating the slide, and means for mounting the work support and operating member for relative bodily straight line movement at an angle to the guideway formed by the operating member and transverse to the axis of oscillation of the work support.

4. A shaping mechanism for a planer having a bed and a tool carrier relatively movable along straight lines parallel with the surface of the bed, such mechanism comprising an oscillatable work support pivoted on the bed, a reciprocative slide for oscillating the work support slidable on the bed transverse to the axis of the work support and having thereon ways transverse to its path of sliding movement, a connecting member forming a pivot on the work support and having a sliding relation on the transverse ways of the slide, and operating connections for imparting sliding movement at a uniform rate to the slide as compared with and by reason of the relative straight line movement of the tool carrier and planer bed.

5. A shaping mechanism for a planer having a bed and a tool carrier relatively movable along straight lines parallel with the surface of the bed, such mechanism comprising an oscillatable work support pivoted on the bed, a reciprocative slide for oscillating the work support slidable on the bed transverse to the axis of the work support and having thereon ways transverse to its path of sliding movement, a connecting member forming a pivot on the work support and having a sliding relation on the transverse ways of the slide, and operating connections for imparting sliding movement at a uniform rate to the slide as compared with and by reason of the relative straight line movement of the tool carrier and planer bed, such operating connections including an angularly adjustable straight movement-imparting bar and a member slidable along the bar.

6. A shaping mechanism for a planer having a stationary frame provided with a tool carrier and a bed movable in straight lines back and forth past the tool carrier, such mechanism comprising an oscillatable work support pivoted on the bed, a reciprocative slide for oscillating the work support slidable transverse to the path of movement of the bed and transverse to the axis of the work support, the slide having thereon ways transverse to the path of its sliding movement, a connecting member forming a pivot on the work support and having a sliding relation on the transverse ways of the slide, a straight stationary movement-imparting bar, a pivot-block slidable along the bar, and operating connections between the pivot block and the slide adapted to impart movement to the latter at a uniform rate by reason of the straight line movement of the planer bed and as compared with such movement of the planer bed.

7. A shaping mechanism for a planer having a bed and tool carriers relatively movable along straight lines parallel with the surface of the bed, such mechanism comprising a work-supporting platen pivoted on the bed to oscillate on a vertical axis, a work-supporting table pivoted on the bed to rock on a horizontal axis, and means actuated by the relative movement of the planer bed and tool carriers to oscillate the work supports independently or concurrently.

8. A shaping mechanism for a planer having a stationary frame provided with tool carriers and a bed movable in straight lines back and forth past the tool carriers, such mechanism comprising an oscillatable work-supporting platen pivoted on the bed to oscillate on a vertical axis, a work-supporting table pivoted on the bed to rock on a horizontal axis, a stationary movement-imparting bar, a block slidable along the bar, and means carried by the planer bed and connected to the sliding block to oscillate the work supports independently or concurrently by reason of the movements of the planer bed.

9. A shaping mechanism for a planer having a stationary frame provided with tool carriers and a bed movable in straight lines back and forth past the tool carriers, such mechanism comprising an oscillatable work-supporting platen pivoted on the bed to oscillate on a vertical axis, a work-supporting table pivoted on the bed to rock on a horizontal axis, a shaft journaled in bearings on and extending longitudinally of the planer bed, a rack slidably mounted on the bed and connected to the platen to oscillate the platen, a pinion loosely rotative on the shaft engaging the rack, a second rack slidably mounted on the bed and connected to the table to rock the table, a second pinion loosely rotative on the shaft engaging the second rack, means operated by the movement of the planer bed for rotating the shaft, and clutching means for independently or concurrently connecting the said pinions to the shaft.

10. A shaping mechanism for a planer having a stationary frame provided with tool carriers and a bed movable in straight lines back and forth past the tool carriers, such mechanism comprising an oscillatable work-supporting platen pivoted on the bed to oscillate on a vertical axis, a work-supporting table pivoted on the bed to rock on a horizontal axis, a shaft journaled in bearings on and extending longitudinally of the planer bed, a rack slidably mounted on the bed and connected to the platen to oscillate the platen, a pinion loosely rotative on the shaft engaging the rack, a second rack slidably mounted on the bed and connected to the table to rock the table, a second pinion loosely rotative on the shaft engaging the second rack, a stationary movement-imparting bar, a pivot block slidable along the bar, a third rack slidably mounted on the bed and pivoted to the sliding pivot block, a pinion fixed on the shaft and engaging the third rack, and clutching means for independently or concurrently connecting the loose pinions to the shaft.

11. A shaping mechanism for a planer having a stationary frame provided with tool carriers and a bed movable in straight lines back and forth past the tool carriers, such mechanism comprising an oscillatable work-supporting platen pivoted on the bed to oscillate on a vertical axis, a work-supporting table pivoted on the bed to rock on a horizontal axis, a shaft journaled in bearings on and extending longitudinally of the planer bed, a rack slidably mounted on the bed and connected to the platen to oscillate the platen, a pinion loosely rotative on the shaft engaging the rack, a second rack slidably mounted on the bed and connected to the table to rock the table, a second pinion loosely rotative on the shaft engaging the second rack, a stationary movement-imparting bar, a pivot block slidable along the bar, a third rack slidably mounted on the bed and pivoted to the sliding pivot block, a pinion fixed on the shaft and engaging the third rack, clutching means for independently or concurrently connecting the loose pinions to the shaft, and means for simultaneously oppositely adjusting the opposite ends of the movement-imparting bar.

12. A shaping mechanism for a planer having a bed and a tool carrier relatively movable along straight lines parallel with the surface of the bed, such mechanism comprising an oscillatable work support pivoted on the bed, a reciprocative slide for oscillating the work support slidable on the bed transverse to the axis of the work support and connected thereto, an angularly adjustable movement-imparting bar for imparting work-support-oscillating movement to the slide, and means supporting such bar only at its opposite ends for simultaneously oppositely adjusting the opposite ends of the bar to alter its angular position.

13. A shaping mechanism for a planer having a bed and a tool carrier relatively movable along straight lines parallel with the surface of the bed, such mechanism comprising an oscillatable work support pivoted on the bed, a shaft journaled in bearings on and extending longitudinally of the bed, a rack slidable transversely of the bed and connected to the work support to oscillate the latter, a rack-operating pinion on the shaft, a movement-imparting bar stationary relative to the tool carrier, a shaft-operating rack slidable transversely of the bed and connected to the movement-imparting bar to slide along such bar, and a pinion on the shaft engaged by the shaft-operating rack.

14. A shaping mechanism for a planer having a bed and a tool carrier relatively movable along straight lines parallel with the surface of the bed, such mechanism comprising an oscillatable work support pivoted on the bed, a shaft journaled on and extending longitudinally of the bed, a rack slidable on the bed transverse to the axis of the work support and provided with a slideway transverse to its path of sliding movement, a connecting member forming a pivot on the work support and slidable along the slideway of the rack, a rack-operating pinion on the shaft, a movement-imparting bar stationary relative to the tool carrier, a shaft-operating rack slidable transversely of the bed and connected to the movement-imparting bar to slide along such bar, and a pinion on the shaft engaged by the shaft-operating rack.

15. The combination, in a shaping mechanism, of a tool carrier, an oscillatable work support, means for supporting the tool carrier and the work support for relative bodily straight line movement transverse to the axis of oscillation of the work support, a reciprocative slide for oscillating the work support slidable transverse to the axis of oscillation of the work support and having thereon a slideway transverse to the path of its sliding movement, a connecting member forming a pivotal connection to the work support and slidable along the transverse slideway on the slide, and operating connections for imparting sliding movement at a uniform rate to the slide as compared with the relative bodily straight line movement of the tool carrier and work support.

16. The combination, in a shaping mechanism, of a tool carrier, an oscillatable work support having a wrist pin, supporting means upon which the tool carrier and the oscillatable work support are mounted for relative bodily straight line movement transverse to the axis of oscillation of the work support, a reciprocative slide for oscillating the work support slidable transverse to the axis of oscillation of the work support and having a transverse slideway engaging with the wrist pin to oscillate the work support, and operating connections for imparting sliding movement at a uniform rate to the slide as compared with the relative bodily straight line movement of the tool carrier and work support.

17. The combination, in a shaping mechanism, of a tool carrier, an oscillatable work support having a wrist pin rigidly projecting therefrom, means for mounting the tool carrier and the work support for relative bodily straight line movement transverse to the axis of oscillation of the work support, a reciprocative slide for oscillating the work support and having thereon a straight slideway transverse to the path of its sliding movement, a sliding block guided by the slideway and forming a pivotal bearing for the wrist pin, and operating connections for imparting sliding movement at a uniform rate to the slide as compared with the relative bodily straight line movement of the tool carrier and work support.

18. In a shaping mechanism, an oscillatable work support mounted for bodily straight line movement transverse to its axis of oscillation, a reciprocative slide for oscillating the work support slidable transverse to the axis of the work support and having thereon ways transverse to its path of sliding movement, a connecting member forming a pivot on the work support and having a sliding relation on the transverse ways of the slide, and operating connections for imparting sliding movement at a uniform rate to the slide as compared with the bodily straight line movement of the work support.

19. In a shaping mechanism, an oscillatable work support having a wrist pin, the work support being mounted for bodily straight line movement transverse to its axis of oscillation, a reciprocative slide for oscillating the work support slidable transverse to the axis of the work support and having a straight transverse slideway engaging with the wrist pin to oscillate the work support, and operating connections for imparting sliding movement at a uniform rate to the slide as compared with the bodily straight line movement of the work support.

20. In a shaping mechanism, an oscillatable work support having a wrist pin rigidly projecting therefrom, the work support being mounted for bodily straight line movement transverse to its axis of oscillation, a reciprocative slide for oscillating the work support slidable transverse to the axis of the work support and having a straight transverse slot therein forming a slideway, a sliding block in the slideway slot forming a pivotal bearing for the wrist pin, and operating connections for imparting sliding movement at a uniform rate to the slide as compared with the bodily straight line movement of the work support.

21. The combination, in a shaping mechanism, of a tool carrier, an oscillatable work support, means for supporting the tool carrier and the work support for relative bodily straight line movement transverse to the axis of oscillation of the work support, a reciprocative slide for oscillating the work support slidable transverse to the axis of oscillation of the work support and having thereon a slideway transverse to the path of its sliding movement, a connecting member forming a pivotal connection to the work support and slidable along the transverse slideway on the slide, and an operating bar inclinable more or less to the path of relative bodily straight line movement of the tool carrier and the work support and having a straight guideway for imparting reciprocating movement to the slide by reason of said relative bodily straight line movement of the tool carrier and the work support, whereby the resultant movement from the combining of the oscillating and straight line movements will cause the tool to describe a radial curve upon the work.

22. The combination, in a shaping mechanism, of a tool carrier, an oscillatable work support having a wrist pin, supporting means upon which the tool carrier and the oscillatable work support are mounted for relative bodily straight line movement transverse to the axis of oscillation of the work support, a reciprocative slide for oscillating the work support slidable transverse to the axis of oscillation of the work support and having a transverse slideway engaging with the wrist pin to oscillate the work support, and an operating bar inclinable more or less to the path of relative bodily straight line movement of the tool carrier and the work support and having a straight guideway for imparting reciprocating movement to the slide by reason of said relative bodily straight line movement of the tool carrier and the work support, whereby the resultant movement from the combining of the oscillating and straight line movements will cause the tool the describe a radial curve upon the work.

23. The combination, in a shaping mechanism, of a tool carrier, an oscillatable work support having a wrist pin rigidly projecting therefrom, means for mounting the tool carrier and the work support for relative bodily straight line movement transverse to the axis of oscillation of the work support, a reciprocative slide for oscillating the work support and having thereon a straight slideway transverse to the path of its sliding movement, a sliding block guided by the slideway and forming a pivotal bearing for the wrist pin, and an operating bar inclinable more or less to the path of relative bodily straight line movement of the tool carrier and the work support and having a straight guideway for imparting reciprocating movement to the slide by reason of said relative bodily straight line movement of the tool carrier and the work support, whereby the resultant movement from the combining of the oscillating and straight line movements will cause the tool to describe a radial curve upon the work.

In testimony whereof we have affixed our signatures.

WILLARD F. MEYERS.
MORRIS SIMONS.

Copies of this patent may be obtained for five cents each, by addressing the "Commissioner of Patents, Washington, D. C."